United States Patent
Robert et al.

(10) Patent No.: US 12,009,707 B2
(45) Date of Patent: Jun. 11, 2024

(54) ELECTROMECHANICAL ACTUATOR, MOTORIZED DRIVE DEVICE COMPRISING SUCH AN ELECTROMECHANICAL ACTUATOR AND CONCEALMENT DEVICE COMPRISING SUCH A MOTORIZED DRIVE DEVICE

(71) Applicant: SOMFY ACTIVITES SA, Cluses (FR)

(72) Inventors: Héléna Robert, Cluses (FR); Cyril Schuehmacher, Cluses (FR); Joël Ramos, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 18/546,730

(22) PCT Filed: Feb. 21, 2022

(86) PCT No.: PCT/EP2022/054230
§ 371 (c)(1),
(2) Date: Aug. 16, 2023

(87) PCT Pub. No.: WO2022/175518
PCT Pub. Date: Aug. 25, 2022

(65) Prior Publication Data
US 2024/0088761 A1    Mar. 14, 2024

(30) Foreign Application Priority Data
Feb. 22, 2021    (FR) .................................... 2101691

(51) Int. Cl.
*H02K 11/40*    (2016.01)
*E06B 9/42*    (2006.01)
(Continued)

(52) U.S. Cl.
CPC ............... *H02K 11/40* (2016.01); *E06B 9/42* (2013.01); *E06B 9/72* (2013.01); *H02K 7/116* (2013.01);
(Continued)

(58) Field of Classification Search
CPC .......... E06B 9/42; H02K 11/40; H02K 11/33; H02K 7/116; H02K 2207/03; H02K 2211/03
See application file for complete search history.

(56) References Cited

U.S. PATENT DOCUMENTS 6,497,267 B1 * 12/2002 Azar ...................... E06B 9/70
242/906
9,822,584 B2 * 11/2017 Mullet .................... H01Q 1/50
(Continued)

FOREIGN PATENT DOCUMENTS

| EP | 3741955 A1 | 11/2020 |
| FR | 2769765 A1 | 4/1999 |
| FR | 3072116 A1 | 4/2019 |

OTHER PUBLICATIONS

International Search Report w/English translation for PCT/EP2022/054230 dated May 9, 2022, 5 pages.
(Continued)

*Primary Examiner* — Beth A Stephan
(74) *Attorney, Agent, or Firm* — NIXON & VANDERHYE

(57) ABSTRACT

An electromechanical actuator includes a casing, a torque support, a ring, an electrical power supply cable and a device for discharging electrostatic charge. The ring is inserted partly around the torque support and forms a bearing guiding the rotation of a winding tube. The discharge device includes an electrical conduction element, which is configured to be in electrical contact with the tube, and an electrical linking element. The ring bears the electrical conduction element.
(Continued)

The torque support at least partly accommodates the electrical linking element. The electrical conduction element is configured to be in electrical contact with the electrical linking element. The electrical linking element electrically connects the electrical conduction element to a shielding or to an earth electrical conductor of the cable.

10 Claims, 11 Drawing Sheets

(51) Int. Cl.
    *E06B 9/72*     (2006.01)
    *H02K 7/116*     (2006.01)
    *H02K 11/33*     (2016.01)

(52) U.S. Cl.
    CPC ......... *H02K 11/33* (2016.01); *H02K 2207/03* (2013.01); *H02K 2211/03* (2013.01)

(56) References Cited

U.S. PATENT DOCUMENTS 10,519,713 B2 * 12/2019 Holt .......................... E06B 9/50
2017/0310351 A1   10/2017 Ramus

OTHER PUBLICATIONS

Written Opinion of the ISA for PCT/EP2022/054230 dated May 9, 2022, 6 pages.
French Search Report for FR2101691 dated Nov. 24, 2021, 2 pages.

* cited by examiner

ELECTROMECHANICAL ACTUATOR, MOTORIZED DRIVE DEVICE COMPRISING SUCH AN ELECTROMECHANICAL ACTUATOR AND CONCEALMENT DEVICE COMPRISING SUCH A MOTORIZED DRIVE DEVICE

CROSS-REFERENCE TO RELATED APPLICATIONS

This application is the US national stage of PCT/EP2022/054230, filed Feb. 21, 2022 and designating the United States, which claims the priority of FR 2101691, filed Feb. 22, 2021. The entire contents of each foregoing application are incorporated herein by reference.

BACKGROUND OF THE INVENTION

Field of the Invention

The present invention relates to an electromechanical actuator for a shading device, in other words an electromechanical actuator of a shading device. The present invention also relates to a motorized driving device for a shading device, in other words a motorized driving device of a shading device. The present invention relates finally to a shading device comprising a screen moved by such a motorized driving device.

In general, the present invention relates to the field of shading devices comprising a motorized driving device moving a screen, between at least one first position and at least one second position.

Description of the Related Art

A motorized driving device comprises an electromechanical actuator of a movable closure, covering, or solar protection element, such as a shutter, a door, a gate, a blind or any other equivalent equipment, hereinafter referred to as a screen.

Electromechanical actuators are already known for a shading device comprising a casing, a torque support, a ring, an electrical power supply cable and an electric motor. The torque support is arranged at a first end of the casing. The ring is inserted at least partly around the torque support. The ring forms a bearing guiding the rotation of a winding tube of a motorized driving device of the shading device, around the casing of the electromechanical actuator. The electrical power supply cable is configured to be connected to an electrical power supply network. The electric motor is mounted inside the casing. The electric motor is supplied with electrical energy via the electrical power supply cable.

In a shading device, electrostatic charges are generated by the friction of a screen, in particular a fabric, against a plastic or metal part, in particular the winding tube of the screen or a support holding the winding tube.

EP 3 741 955 A1 is also known which describes an electromechanical actuator associated with a device for discharging electrostatic charges from a motorized driving device for a shading device. The device for discharging electrostatic charge comprises an electrical conduction element. The electrical conduction element is configured to be in electrical contact with a winding tube.

However, this motorized driving device has the disadvantage that the electrical conduction element electrically connects a casing of the electromechanical actuator to the winding tube and that the casing of the electromechanical actuator is connected to an earth lead, formed by an earth conductor of the electrical power supply cable of the electromechanical actuator.

Therefore, the electrical conduction element creates an electrical conduction path between the winding tube and the casing of the electromechanical actuator, which is made of metal.

Furthermore, the electrical conduction element is fixed to the winding tube and is in sliding electrical contact with the casing of the electromechanical actuator.

Moreover, the electrical conduction element, arranged between the winding tube and the casing of the electromechanical actuator, is an accessory, to be mounted by an installer around the casing of the electromechanical actuator, when installing the motorized driving device in the shading device.

On the one hand, such an accessory runs the risk of being forgotten when the motorized driving device is installed in the shading device. On the other hand, this accessory increases the cost of obtaining the motorized driving device and the time required to assemble it.

Furthermore, with such a device for discharging electrostatic charge, an external surface of the casing of the electromechanical actuator must be without a protective coating, such as paint, whereas one is generally provided to prevent corrosion of the casing of the electromechanical actuator.

Therefore, with such a device for discharging electrostatic charge, the casing of the electromechanical actuator is no longer a standard component for a manufacturer of electromechanical actuators for shading devices.

FR 3 072 116 A1 is also known which describes an electromechanical actuator for a shading device comprising a casing, a torque support, a ring, an electric electrical power supply cable, an electric motor, an electronic control unit and a device for discharging electrostatic charge. The torque support is arranged at a first end of the casing. The ring is inserted at least partly around the torque support. The ring forms a bearing guiding the rotation of a winding tube of a motorized driving device of the shading device, around the casing of the electromechanical actuator. The electrical power supply cable is configured to be connected to an electrical power supply network. The electric motor is mounted inside the casing. The electric motor is supplied with electrical energy via the electrical power supply cable. The device for discharging electrostatic charge is implemented by means of a spark gap provided on a printed circuit board of the electronic control unit. The spark gap comprises first and second electrodes formed respectively by a first conductive track and by a second conductive track on the printed circuit board. The first electrode is electrically connected to the casing. Furthermore, the second electrode is electrically connected to one of the electrical power supply conductors of the electric motor.

SUMMARY OF THE INVENTION

The purpose of the present invention is to overcome the aforementioned disadvantages and to propose an electromechanical actuator for a shading device, a motorized driving device for a shading device, and a shading device comprising a screen moved by such a motorised driving device, enabling electrostatic charges to be discharged outside the electromechanical actuator, in particular without damaging electronic components of an electronic control unit of the electromechanical actuator, so as to guarantee the reliability of operation of this electromechanical actuator.

To this end, the present invention relates, according to a first aspect, to an electromechanical actuator for a shading device, the electromechanical actuator comprising at least:
a casing,
a torque support, the torque support being arranged at a first end of the casing,
a ring, the ring being inserted at least partly around the torque support, the ring forming a bearing guiding the rotation of a winding tube of a motorized driving device of the shading device, around the casing of the electromechanical actuator,
an electrical power supply cable, the electrical power supply cable being configured to be connected to an electrical power supply network, the electrical power supply cable comprising either at least one shielding or at least one earth electrical conductor,
an electric motor, the electric motor being mounted within the casing, the electric motor being supplied with electrical energy via the electrical power supply cable, and
a device for discharging electrostatic charges, the device for discharging electrostatic charges comprising at least one electrical conduction element, the electrical conduction element being configured to be in electrical contact with the winding tube.

According to the invention, the ring bears the electrical conduction element of the device for discharging electrostatic charge. The device for discharging electrostatic charge further comprises at least one electrical linking element. The torque support at least partly accommodates the electrical linking element. The electrical conduction element, arranged at the ring, is configured to be in electrical contact with the electrical linking element, arranged at least partly at the torque support. Furthermore, the electrical linking element electrically connects the electrical conduction element to the shielding of the electrical power supply cable or to the earth electrical conductor of the electrical power supply cable.

Thus, the discharge of electrostatic charges through the device for discharging electrostatic charge makes it possible to create a preferential discharge path from the winding tube, to the electrical conduction element, arranged at the ring, to the electrical linking element, arranged at least partly at the torque support, then to the shielding of the electrical power supply cable or the earth electrical conductor of the electrical power supply cable.

In this way, the discharge of electrostatic charges through the electrical conduction element, arranged at the ring, and the electrical linking element, arranged inside the electromechanical actuator, in particular inside the torque support and, eventually, the casing, makes it possible to avoid malfunctions and/or damage to the electromechanical actuator and, in particular, to prevent the destruction of electronic components mounted on one or more printed circuit boards of an electronic control unit.

Therefore, the electrical conduction element and the electrical linking element enable electrostatic charges accumulated in a screen of the shading device to be dissipated.

Furthermore, the discharge of electrostatic charges through the device for discharging electrostatic charge is carried out continuously.

In this way, following an accumulation of electrostatic charges due, in particular, to a screen of the shading device rubbing against one or more assembly elements of the shading device, the electromechanical actuator is not subjected to a discharge of electrostatic charges via an electric arc.

According to an advantageous feature of the invention, the electrical conduction element, arranged at the ring, is rotatable relative to the electrical linking element, arranged at least partly at the torque support.

According to another advantageous feature of the invention, the electrical conduction element, arranged at the ring, is in permanent electrical contact with the electrical linking element, arranged at least partly at the torque support, when the ring is rotated around the torque support.

In a variant, the electrical conduction element, arranged at the ring, is periodically in electrical contact with the electrical linking element, arranged at least partly at the torque support, when the ring is rotated around the torque support.

According to another advantageous feature of the invention, the electromechanical actuator further comprises an electronic control unit. The electronic control unit comprises at least one printed circuit board, a first electrical connecting element and a second electrical connecting element. The first electrical connecting element is mounted on the printed circuit board. The second electrical connecting element is electrically connected to the first electrical connecting element. The electrical linking element is electrically connected to the first electrical connecting element. Furthermore, the second electrical connecting element is electrically connected to the shielding of the electrical power supply cable or to the earth electrical conductor of the electrical power supply cable.

According to another advantageous feature of the invention, the electrical linking element extends from the electrical conduction element, arranged at the ring, to the first electrical connecting element of the electronic control unit.

According to another advantageous feature of the invention, the electrical conduction element comprises a body and at least one contact tab. Furthermore, the or each contact tab is connected to the body.

In a second aspect, the present invention relates to a motorized driving device for a shading device,
the motorized driving device comprising at least:
an electromechanical actuator,
a winding tube, the winding tube being arranged to be rotated by the electromechanical actuator.

According to the invention, the electromechanical actuator is in accordance with the invention and as mentioned above.

This shading device has similar features and advantages to those described above, in relation to the electromechanical actuator according to the invention.

According to an advantageous feature of the invention, the electrical conduction element, arranged at the ring, is configured to be in electrical contact with an inner face of the winding tube.

In a third aspect, the present invention relates to a shading device,
the shading device comprising at least:
a screen, and
a motorized driving device, the screen being rollable on a winding tube of the motorized driving device.

According to the invention, the motorized driving device is in accordance with the invention and as mentioned above.

This shading device has similar features and advantages to those described above, in relation to the electromechanical actuator and the motorized driving device according to the invention.

BRIEF DESCRIPTION OF THE DRAWINGS

Further features and advantages of the invention will become apparent from the following description, made with reference to the attached drawings, which are given as non-limiting examples and wherein.

DETAILED DESCRIPTION

Figure 1:
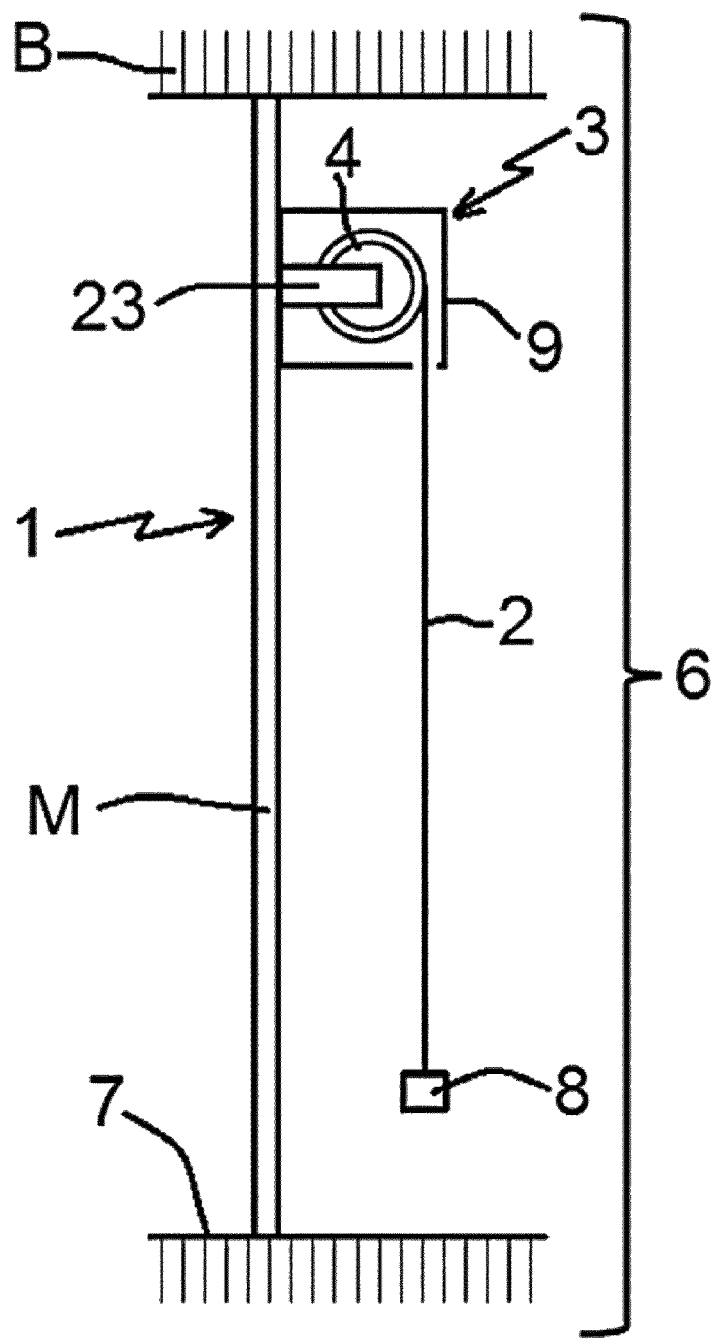
FIG. 1 is a schematic transverse cross-section view of a covering installation according to a first embodiment of the invention.
Figure 2:
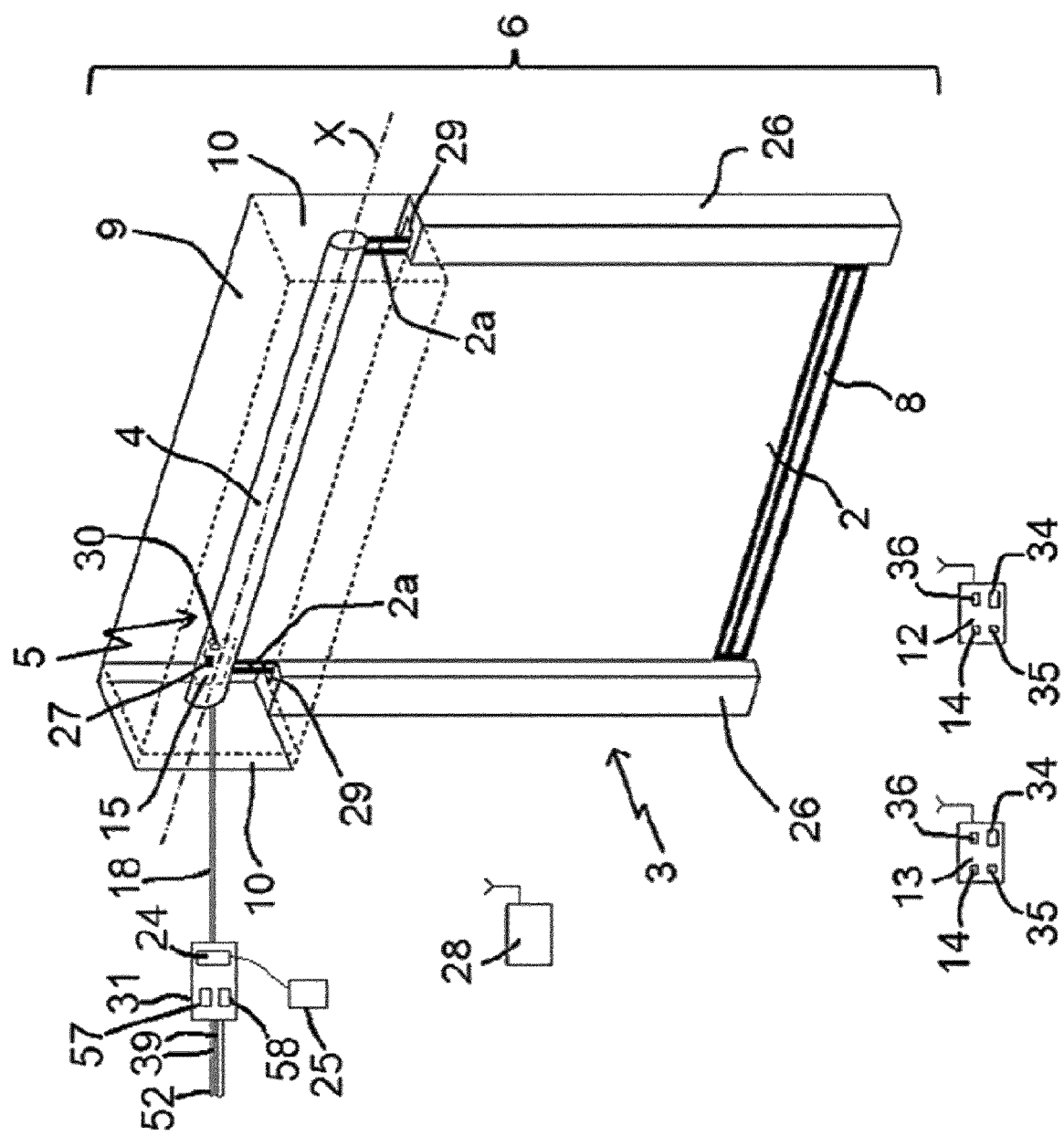
FIG. 2 is a schematic perspective view of the installation illustrated in FIG. 1.

Firstly, with reference to FIGS. 1 and 2, an installation 6 comprising a closure, covering or solar protection device 3 is described, this installation 6 being according to a first embodiment of the invention, installed in a building B comprising an opening 1, in which a window or a door is arranged. This installation 6 is equipped with a screen 2 belonging to the closure, covering or solar protection device 3, in particular a motorized blind.

The closure, covering or solar protection device 3 is hereinafter referred to as the "shading device". The shading device 3 comprises the screen 2.

The shading device 3 can be a blind, in particular a blind with a roll-up fabric, or a roller shutter. The present invention is applicable to all types of shading devices.

Figure 6:
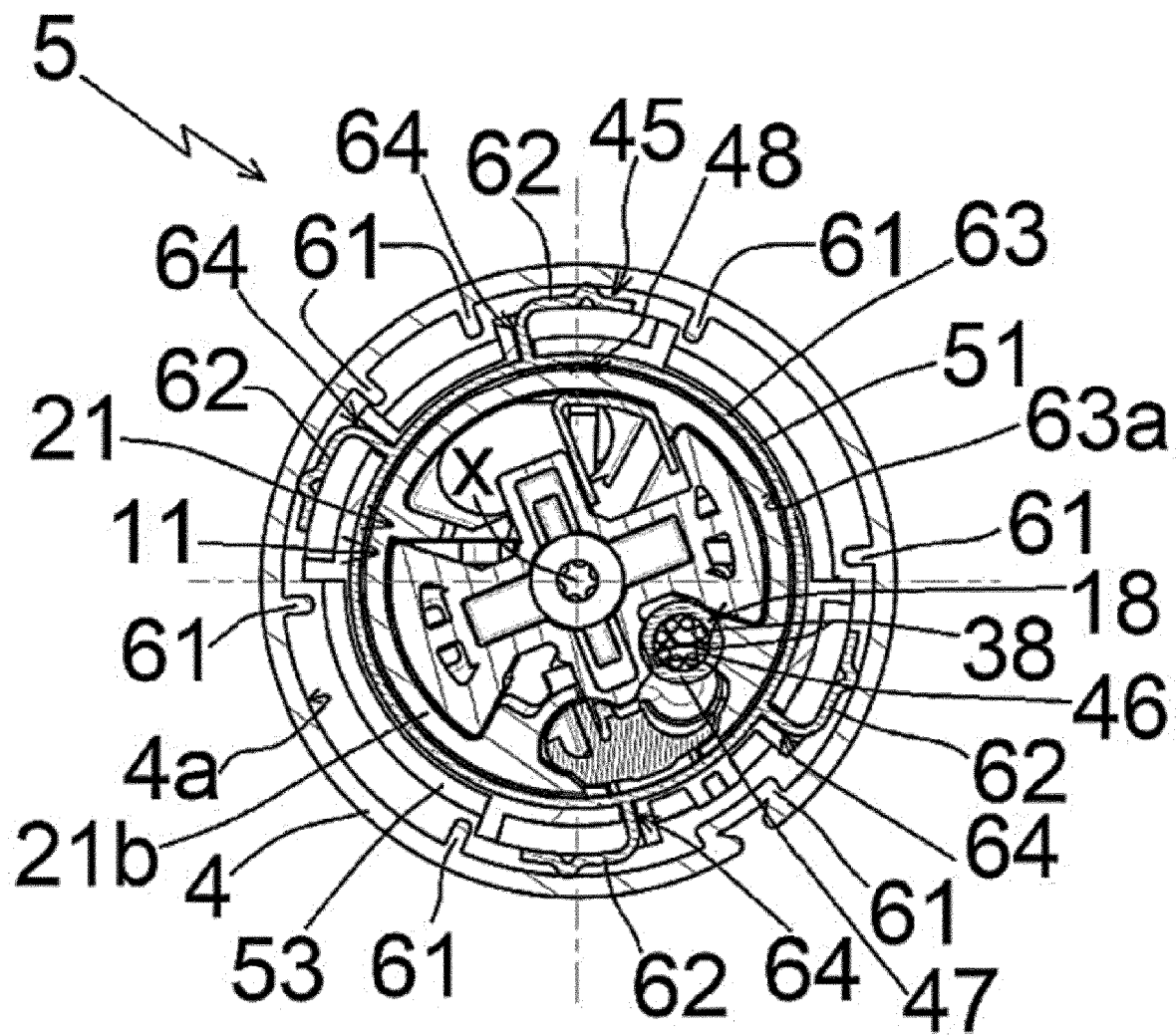
FIG. 6 is a second schematic cross-section view, in detail and on an even larger scale, of the motorized driving device illustrated in FIGS. 3 to 5, according to a section plane orthogonal to the axis of rotation of the output shaft of the electromechanical actuator, the section plane of FIG. 6 being marked by the line V-V in FIG. 5.

With reference to FIGS. 1 and 6, a roller blind according to the first embodiment of the invention is described.

The shading device 3 comprises a motorized driving device 5, according to the first embodiment of the invention. The motorized driving device 5 comprises an electromechanical actuator 11 illustrated in FIGS. 3 to 6.

The motorized driving device 5 and, therefore, the shading device 3 further comprises a winding tube 4. Furthermore, the winding tube 4 is arranged to be rotated by the electromechanical actuator 11.

Here, the screen 2 can be rolled onto the winding tube 4.

Thus, the screen 2 of the shading device 3 is rolled onto the winding tube 4 or unwound around it, the winding tube 4 being driven by the motorized driving device 5, in particular by the electromechanical actuator 11.

In this way, the screen 2 can be moved between a rolled position, in particular a high position, and an unrolled position, in particular a low position, and vice-versa.

The screen 2 of the shading device 3 is a closure, covering and/or solar protection screen, which can be wound and unwound around the winding tube 4, the inner diameter of which is greater than the outer diameter of the electromechanical actuator 11, so that the electromechanical actuator 11 can be inserted into the winding tube 4, when the shading device 3 is assembled.

Advantageously, the shading device 3 further comprises a holding device 9, 23.

Advantageously, the holding device 9, 23 can comprise two supports 23. A support 23 is arranged at each end of the winding tube 4, in particular in an assembled configuration of the shading device 3.

Thus, the winding tube 4 is held by the supports 23. Only one of the supports 23 is visible in FIG. 1 and they are not shown in FIG. 2. The supports 23 allow the shading device 3 to be mechanically connected to the structure of the building B, in particular to the wall M of the building B.

Advantageously, the holding device 9, 23 can comprise a box 9. Furthermore, the winding tube 4 and at least part of the screen 2 are housed inside the box 9, in particular in the assembled configuration of the shading device 3.

In general, the box 9 is arranged above the opening 1, or at the upper part of the opening 1.

Here and as illustrated in FIG. 1, the supports 23 are also housed inside the box 9.

Advantageously, the box 9 comprises two cheeks 10, as illustrated in FIG. 2. One cheek 10 is arranged at each end of the box 9, in particular in the assembled configuration of the shading device 3.

In a variant, as illustrated in FIG. 2, the winding tube 4 is held via the box 9, in particular via the cheeks 10 of the box 9, without using supports, such as the supports 23 mentioned above.

Advantageously, the shading device 3 can also comprise two lateral slides 26, as illustrated only in FIG. 2. Each lateral slide 26 comprises a groove 29. Each groove 29 of one of the lateral slides 26 cooperates, in other words is configured to cooperate, with a lateral edge 2a of the screen 2, in particular in the assembled configuration of the shading device 3, so as to guide the screen 2, during the rolling and unrolling of the screen 2 around the winding tube 4.

The electromechanical actuator 11 is, for example, of the tubular type. This allows the winding tube 4 to be rotated around an axis of rotation X, so that the screen 2 of the shading device 3 can be moved, in particular unrolled or rolled.

In a mounted state of the shading device 3, the electromechanical actuator 11 is inserted into the winding tube 4.

The shading device 3 further comprises a load bar 8 for exerting a tension on the screen 2.

The roller blind, which forms the shading device 3, comprises a fabric, which forms the screen 2 of the roller blind 3. A first end of the screen 2, in particular the upper end of the screen 2, in the assembled configuration of the shading device 3, is fixed to the winding tube 4. Furthermore, a second end of the screen 2, in particular the lower end of the screen 2, in the assembled configuration of the shading device 3, is fixed to the load bar 8.

Here, the fabric forming the screen 2 is made of a textile material.

In an example of realization, not shown, the first end of the screen 2 has a hem through which a rod, in particular one made of plastic, is arranged. This hem at the first end of the screen 2 is achieved by sewing the fabric forming the screen 2. When assembling the screen 2 to the winding tube 4, the hem and the rod at the first end of the screen 2 are slid into a groove on the outside of the winding tube 4, in particular over the entire length of the winding tube 4, so that the screen 2 is rigidly connected to the winding tube 4 and can be rolled up or unrolled around the winding tube 4.

In any case, the first end of the screen 2 is arranged at the holding device 9, 23, such that this first end remains above the opening 1 in the assembled configuration of the shading device 3.

In the case of a roller blind, the upper rolled position corresponds to a predetermined upper end-of-travel position, or to the bearing of the load bar 8 of the screen 2 against an edge of the box 9 of the roller blind 3, and the lower unrolled position corresponds to a predetermined lower end-of-travel position, or to the bearing of the load bar 8 of the screen 2 against a threshold 7 of the opening 1, or to the complete unrolling of the screen 2.

Advantageously, the motorized driving device 5 is controlled by a command unit. The command unit can be, for example, a local command unit 12 or a central command unit 13.

Advantageously, the local command unit 12 can be connected to the central command unit 13, via a wired or wireless connection.

Advantageously, the central command unit 13 can control the local command unit 12, and other similar local command units distributed throughout the building B.

The motorized driving device 5 is, preferably, configured to execute the commands for closing or opening the screen 2 of the shading device 3, which can be emitted, especially, by the local command unit 12 or the central command unit 13.

The installation 6 comprises the local command unit 12, the central command unit 13, or both the local command unit 12 and the central command unit 13.

The motorized driving device 5, including the electromechanical actuator 11, belonging to the installation 6 and, more particularly, to the shading device 3 illustrated in FIGS. 1 and 2, is now described, in more detail with reference to FIGS. 3 to 8.

The electromechanical actuator 11 comprises an electric motor 16. The electric motor 16 is shown by its outline in FIG. 4, without details of its internal components, which are known per se.

Here, the electric motor 16 comprises a rotor and a stator, not shown, positioned coaxially around the axis of rotation X of the winding tube 4 in the mounted configuration of the motorized driving device 5.

Means for controlling the electromechanical actuator 11, allowing the movement of the screen 2 of the shading device 3, comprise at least one electronic control unit 15. This electronic control unit 15 is able to turn on the electric motor 16 of the electromechanical actuator 11 and, in particular, to enable the supply of electrical energy to the electric motor 16.

Thus, the electronic control unit 15 controls, especially, the electric motor 16, so as to open or close the screen 2, as described previously.

The means of controlling the electromechanical actuator 11 comprise hardware and/or software means.

As a non-limiting example, the hardware means can comprise at least one microcontroller 30.

Advantageously, the electronic control unit 15 further comprises a first communication module 27, in particular for receiving command orders, the command orders being emitted by a command order transmitter, such as the local command unit 12 or central command unit 13, these command orders being intended to control the motorised driving device 5.

Advantageously, the first communication module 27 of the electronic control unit 15 is wireless. In particular, the first communication module 27 is configured to receive radio command orders.

Advantageously, the first communication module 27 can also allow the reception of command orders transmitted by wired means.

Advantageously, the electronic control unit 15, the local command unit 12 and/or the central command unit 13 can be in communication with a weather station located inside the building B or remote outside the building B, including, especially, one or more sensors that can be configured to determine, for example, temperature, brightness, or wind speed, in the case where the weather station is placed outside the building B.

Advantageously, the electronic control unit 15, the local command unit 12 and/or the central command unit 13 can also be in communication with a server 28, as illustrated in FIG. 2, so as to control the electromechanical actuator 11 according to data made available remotely via a communication network, in particular an Internet network that can be connected to the server 28.

The electronic control unit 15 can be controlled from the local command unit 12 and/or central command unit 13. The local command unit 12 and/or central command unit 13 is provided with a control keyboard. The control keyboard of the local command unit 12 or central command unit 13 comprises one or more selection elements 14 and, eventually, one or more display elements 34.

As non-limiting examples, the selection elements can include push buttons and/or touch-sensitive keys. The display elements can comprise light emitting diodes and/or an LCD display (Liquid Crystal Display) or TFT display (Thin Film Transistor). The selection and display elements can also be realised by means of a touch screen.

Advantageously, the local command unit and/or central command unit 13 comprises at least a second communication module 36.

Thus, the second communication module 36 of the local command unit 12 or central command unit 13 is configured to emit, in other words emits, command orders, in particular by wireless means, for example radio, or by wired means.

Furthermore, the second communication module 36 of the local command unit 12 or central command unit 13 can also be configured to receive, in other words receives, command orders, in particular via the same means.

Advantageously, the second communication module 36 of the local command unit 12 or central command unit 13 is configured to communicate, in other words communicates, with the first communication module 27 of the electronic control unit 15.

Thus, the second communication module 36 of the local command unit 12 or central command unit 13 exchanges command orders with the first communication module 27 of the electronic control unit 15, either monodirectionally or bidirectionally.

Advantageously, the local command unit 12 is a command point, which can be fixed or mobile. A fixed command point can be a control box to be fixed on a façade of the wall M of the building B or on a face of a frame of a window or door. A mobile command point can be a remote control, a smartphone or a tablet.

Advantageously, the local command unit 12 and/or central command unit 13 further comprises a controller 35.

The motorized driving device 5, in particular the electronic control unit 15, is, preferably, configured to execute command orders for controlling the movement, in particular the closing and opening, of the screen 2 of the shading device 3. These command orders can be emitted, especially, by the local command unit 12 or by the central command unit 13.

The motorized driving device 5 can be controlled by the user, for example by receiving a command order corresponding to pressing the or one of the selection elements 14 of the local command unit 12 or central command unit 13.

The motorized driving device 5 can also be controlled automatically, for example by receiving a command order corresponding to at least one signal from at least one sensor, not shown, and/or a signal from a clock, not shown, of the electronic control unit 15, in particular the microcontroller 30. The sensor and/or the clock can be integrated in the local command unit 12 or in the central command unit 13.

The electromechanical actuator 11 comprises a casing 17, in particular a tubular one. The electric motor 16 is mounted inside the casing 17, in particular in an assembled configuration of the electromechanical actuator 11.

Here, the casing 17 of the electromechanical actuator 11 is cylindrical in shape, especially rotationally symmetrical around the axis of rotation X.

In an example of realization, the casing 17 is made of a metallic material.

The material of the casing of the electromechanical actuator is not limiting and can be different. In particular, it can be a plastic material.

Advantageously, the motorized driving device 5 and, therefore, the shading device 3 further comprises an electrical power supply device 31.

Here, the electromechanical actuator 11 is configured to be electrically connected, in other words is electrically connected, to the electrical power supply device 31.

Advantageously, the electromechanical actuator 11 further comprises first electrical conductors 37.

Figure 4:
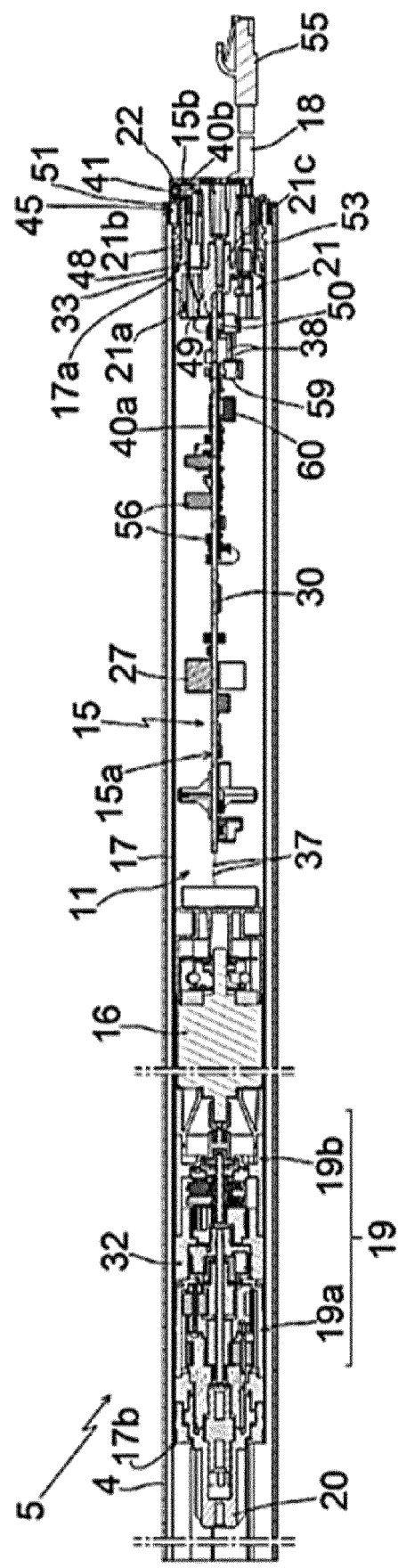
FIG. 4 is a schematic cross-section view of the motorized driving device illustrated in FIG. 3, according to a section plane passing through an axis of rotation of an output shaft of the electromechanical actuator.

Here, the first electrical conductors 37 extend between the electronic control unit 15 and the electric motor 16, as illustrated in the central part of FIG. 4.

The electromechanical actuator 11 further comprises an electrical power supply cable 18.

Advantageously, the electrical power supply cable 18 comprises at least second electrical conductors 38.

Figure 5:
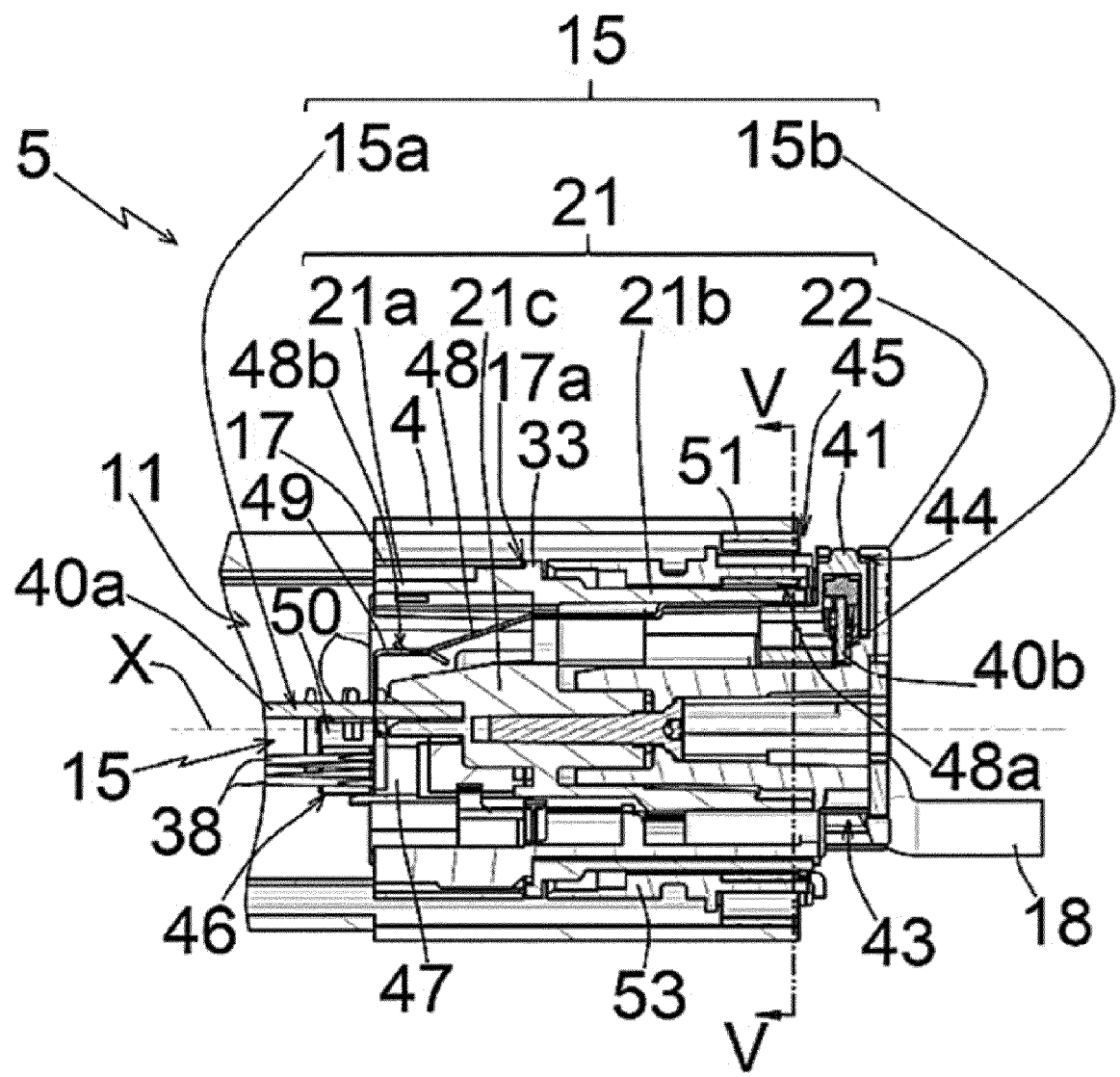
FIG. 5 is a first schematic cross-section view, in detail and on a larger scale, of a part of the motorized driving device illustrated in FIGS. 3 and 4, according to a section plane offset relative to the axis of rotation of the output shaft of the electromechanical actuator.

Here, the second electrical conductors 38 are visible in FIGS. 4 to 6, at one end of the electrical power supply cable 18.

The first electrical conductors 37 are configured to be connected to an electrical power supply network 52, by means of the second electrical conductors 38.

The electric motor 16 is supplied with electrical energy via the first electrical conductors 37, themselves electrically connected to the second electrical conductors 38.

Thus, the electric motor 16 is configured to be supplied, in other words is supplied, with electrical energy from the electrical power supply network 52, through the electrical power supply cable 18.

In this way, the first electrical conductors 37 of the electromechanical actuator 11 are configured to be electrically connected, in other words are electrically connected, to the second electrical conductors 38 of the electrical power supply cable 18. Furthermore, the second electrical conductors 38 of the electrical power supply cable 18 are configured to be electrically connected, in other words are electrically connected, to third electrical conductors 39 of the electrical power supply network 52, for example by means of electrical connectors, such as the first electrical connector 55 of the electrical power supply cable 18 illustrated in FIGS. 3 and 4.

Here, the electromechanical actuator 11 further comprises the electronic control unit 15.

Advantageously, the electronic control unit 15 comprises a first electronic board 15a and a second electronic board 15b.

Advantageously, the electronic control unit 15 and, more particularly, each of the first and second electronic boards 15a, 15b comprises at least one printed circuit board 40a, 40b.

Advantageously, the or each printed circuit board 40a, 40b is equipped with electronic components 56.

The second electrical conductors 38 are configured to electrically connect, in other words electrically connect, the electrical power supply cable 18 to the electronic control unit 15, in particular to the first and second electronic boards 15a, 15b and, more particularly, to the printed circuit board 40a, 40b of each of these first and second electronic boards 15a, 15b.

The first electrical conductors 37 are made by means of electrical wires and/or electrical tracks of the or each printed circuit board 40a, 40b of the electronic control unit 15. Only the part of the first electrical conductors 37 made of electrical wires is visible in FIG. 4.

Here, the electrical power supply cable 18, in particular the second electrical conductors 38, are electrically connected, in other words are configured to be electrically connected, to electrical tracks, not shown, of the first printed circuit board 40a by means of a second electrical connector 59 of the electrical power supply cable 18 and by means of an electrical connector 60 of the first electronic board 15a, as illustrated in FIG. 4.

Here, the voltage of the electrical power supply network 52 is, preferably, continuous and called "very low voltage". The value of the voltage of the electrical energy supply network 52 is, preferably, less than or equal to 120 volts and, more particularly, less than or equal to 50 volts. The value of the voltage of the electrical energy supply network 52 can be, for example, on the order of 12 volts, 24 volts or 48 volts.

As a non-limiting example, the electrical power supply network 52 can be a "PoE" (Power over Ethernet) network.

Here, the electric motor 16 can be of the electronically commutated brushless type, also known as "BLDC" (BrushLess Direct Current) or "permanent magnet synchronous", or DC type.

Advantageously, the electrical energy supply device 31 can comprise at least one battery 24.

The battery 24 can be arranged in the box 9 of the shading device 3. The battery 24 can thus be arranged inside or outside the box 9. The battery 24 can also be arranged inside the winding tube 4, but outside the casing 17. The electromechanical actuator 11 can also comprise the battery 24. The battery 24 can thus be arranged inside the casing 17, in particular in the assembled configuration of the electromechanical actuator 11.

Advantageously, the electrical energy supply device 31 can further comprise at least one hub 57 and, eventually, at least one adapter 58, in particular in the case where the electromechanical actuator 11 is configured to be electrically connected, in other words is electrically connected, to a so-called "PoE" power supply network.

Advantageously, the electrical power supply cable 18 is configured to supply electrical energy, in other words supplies electrical energy, to the electromechanical actuator 11, especially to the electronic control unit 15 and the electric motor 16, in particular from the electrical power supply device 31, in particular from the battery 24.

Advantageously, the battery 24 comprises one or more energy storage cells. The energy storage cells of the battery 24 can be, especially, rechargeable batteries, in which case the battery 24 is of the rechargeable type, or cells.

Advantageously, the motorized driving device 5 and, in particular, the electronic control unit 15, comprises charging elements configured to charge the battery 24 from the electrical energy supplied by an external electrical energy supply source 25, as illustrated in FIG. 2.

Advantageously, the external electrical energy supply source 25 is a charger that can be connected, in other words is connected, to a wall socket, so as to recharge the battery 24 from a mains electrical energy supply network.

Advantageously, the first electronic board 15a is configured to control the electric motor 16. Furthermore, the second electronic board 15b is configured to, especially, access functions for setting parameters and/or configuring the electromechanical actuator 11, by means of selection devices 41 and, eventually, display devices, not shown. Moreover, the second electronic board 15b can be configured to allow recharging the battery 24.

Here and by no means restrictively, the loading elements are arranged on the second electronic board 15b.

The electromechanical actuator 11 further comprises an output shaft 20.

Advantageously, the electromechanical actuator 11 further comprises a gearbox 19.

The gearbox 19 comprises at least one reduction stage. The reduction stage can be an epicyclic gear train.

The type and number of reduction stages of the gearbox are not limiting.

Advantageously, the electromechanical actuator 11 further comprises a brake 32.

As non-limiting examples, the brake 32 can be a spring brake, a cam brake, a magnetic brake or an electromagnetic brake.

The brake 32 is configured to brake and/or rotationally lock the output shaft 20, so as to regulate the rotational speed of the winding tube 4, when the screen 2 is moved, and to keep the winding tube 4 locked, when the electromechanical actuator 11 is electrically deactivated.

Here and as can be seen in FIG. 4, the brake 32 is configured to be arranged, in other words is arranged, in the assembled configuration of the electromechanical actuator 11, between two reduction stages 19a, 19b of the gearbox 19.

In a variant, not shown, the brake 32 is configured to be arranged, in other words is arranged, in the assembled configuration of the electromechanical actuator 11, between the electronic control unit 15 and the electric motor 16, in other words at the input of the electric motor 16, or between the gearbox 19 and the output shaft 20, in other words at the output of the gearbox 19, or between the electric motor 16 and the gearbox 19, in other words at the output of the electric motor 16.

Advantageously, the gearbox 19, and eventually, the brake 32 are arranged inside the casing 17 of the electromechanical actuator 11, in particular in the assembled configuration of the electromechanical actuator 11.

The winding tube 4 is rotated around the axis of rotation X and the casing 17 of the electromechanical actuator 11 and is supported by two pivot connections.

The first pivot connection is made at a first end of the winding tube 4 by means of a ring 53. The ring 53 thus makes it possible to create a bearing.

The ring 53 forms, in other words is configured to form or constitute, a bearing guiding the rotation of the winding tube 4, around the casing 17 of the electromechanical actuator 11, in particular in an assembled configuration of the motorized driving device 5 and, therefore, of the shading device 3.

Here, the electromechanical actuator 11 comprises the ring 53.

In other words, the ring 53 is an integral part of the electromechanical actuator 11, that is to say the ring 53 is not an accessory to be added to the motorized driving device 5 to enable the first pivot connection between the winding tube 4 and the electromechanical actuator 11. The ring 53 cannot therefore be left out when assembling the electromechanical actuator 11 with the winding tube 4, as could be the case with an additional accessory separate from the electromechanical actuator 11, in other words not forming an integral part thereof.

The second pivot connection, not shown, is made at a second end of the winding tube 4.

The electromechanical actuator 11 further comprises a torque support 21, which can also be called "actuator head" or "fixed point".

Here, the torque support 21 is arranged at a first end 17a of the casing 17 of the electromechanical actuator 11, in particular in the assembled configuration of the electromechanical actuator 11.

The torque support 21 makes it possible to absorb the load applied by the electromechanical actuator 11, in particular the torque exerted by the electromechanical actuator 11 relative to the structure of the building B. Advantageously, the torque support 21 also allows the load applied by the winding tube 4, especially the weight of the winding tube 4, the electromechanical actuator 11 and the screen 2 to be taken up and to ensure that this load is absorbed by the structure of the building B.

Thus, the torque support 21 of the electromechanical actuator 11 allows the electromechanical actuator 11 to be fixed to the holding device 9, 23, in particular to one of the supports 23 or to one of the cheeks 10 of the box 9.

Advantageously, the torque support 21 protrudes from the first end 17a of the casing 17 of the electromechanical actuator 11.

Advantageously, the torque support 21 of the electromechanical actuator 11 can also allow the first end 17a of the casing 17 to be shuttered.

Moreover, the torque support 21 of the electromechanical actuator 11 can support at least part of the electronic control unit 15.

Advantageously, the torque support 21 is fixed to the casing 17 by means of one or more fastening elements, not shown, in particular in the assembled configuration of the electromechanical actuator 11. The fastening element(s) can be, especially, bosses, fastening screws, elastic snap-in fastening elements, grooves in indentations or a combination thereof.

Advantageously, the torque support 21 comprises a first part 21a and a second part 21b.

Advantageously, the first part 21a of the torque support 21 is configured to cooperate, in other words cooperates, with the casing 17 of the electromechanical actuator 11, in particular in the assembled configuration of the electromechanical actuator 11. Furthermore, the second part 21b of the torque support 21 is configured to cooperate, in other words cooperates, with the holding device 9, 23, in particular in an assembled configuration of the electromechanical actuator 11 in the shading device 3.

Advantageously, the construction of the torque support 21 comprising the first and second parts 21a, 21b made of a single piece improves the rigidity of the torque support 21.

Advantageously, at least a portion of the first part 21a of the torque support 21 is generally cylindrical in shape and is arranged within the casing 17 of the electromechanical actuator 11, in particular in the assembled configuration of the electromechanical actuator 11.

Advantageously, an outer diameter of at least a portion of the second part 21b of the torque support 21 is larger than an outer diameter of the casing 17 of the electromechanical actuator 11.

Advantageously, the torque support 21 further comprises a stop 33. Furthermore, the stop 33 is in abutment, in other words is configured to be in abutment, with the casing 17, at the first end 17a of the casing 17, in particular in the assembled configuration of the electromechanical actuator 11.

Thus, the stop 33 of the torque support 21 makes it possible to limit the depression of the first part 21a of the torque support 21 into the casing 17, along the direction of the axis of rotation X.

Furthermore, the stop 33 of the torque support 21 delimits the first and second parts 21a, 21b of the torque support 21 from each other.

Thus, only the first portion 21a of the torque support 21 is arranged inside the casing 17 of the electromechanical actuator 11, following the fitting of the torque support 21 inside the casing 17, up to the stop 33, in particular in the assembled configuration of the electromechanical actuator 11.

Here, the stop 33 of the torque support 21 comprises a shoulder and, more particularly, it is made in the form of a flange, in particular of cylindrical shape and with a straight generatrix.

Here and as illustrated in FIGS. 4 to 6, the ring 53 is inserted around the torque support 21, in particular the second part 21b of the torque support 21, in particular in the assembled configuration of the electromechanical actuator 11.

In a variant, not shown, the ring 53 is inserted, on the one hand, around the torque support 21, in particular the second part 21b of the torque support 21, and, on the other hand, around the casing 17 of the electromechanical actuator 11, in particular the first end 17a of the casing 17, in particular in the assembled configuration of the electromechanical actuator 11.

Here, the ring 53 is integral with the electromechanical actuator 11 and, more particularly, with the torque support 21.

Here and as illustrated in FIGS. 4 to 6, the ring 53 is free to rotate around the torque support 21, in particular the second part 21b of the torque support 21.

In a variant, not shown, the ring 53 is free to rotate, on the one hand, around the torque support 21, in particular the second part 21b of the torque support 21, and, on the other hand, around the casing 17 of the electromechanical actuator 11, in particular the first end 17a of the casing 17.

Here, the electronic control unit 15, in particular the first and second electronic boards 15a, 15, are supplied with electrical energy by means of the electrical power supply cable 18.

Advantageously, the electronic control unit 15 is arranged at least partly inside the casing 17 of the electromechanical actuator 11.

Moreover, the electronic control unit 15 can be at least partly arranged outside the casing 17 of the electromechanical actuator 11 and, in particular, mounted in the torque support 21.

Here, the first electronic board 15a of the electronic control unit 15 is arranged inside the casing 17 of the electromechanical actuator 11, in particular in the assembled configuration of the electromechanical actuator 11. Furthermore, the second electronic board 15b is arranged within the torque support 21 of the electromechanical actuator 11, in particular in the assembled configuration of the electromechanical actuator 11.

Here, the electronic control unit 15 does not have a housing for receiving the first electronic board 15a. This first electronic board 15a is, on the one hand, held, especially plugged, in the torque support 21, in particular in a central third part 21c of the torque support 21, as illustrated in FIGS. 4 and 5, and, on the other hand, held, especially plugged into a support, not shown, mounted at the end of the electric motor 16, in particular in the assembled configuration of the electromechanical actuator 11.

Figure 3:
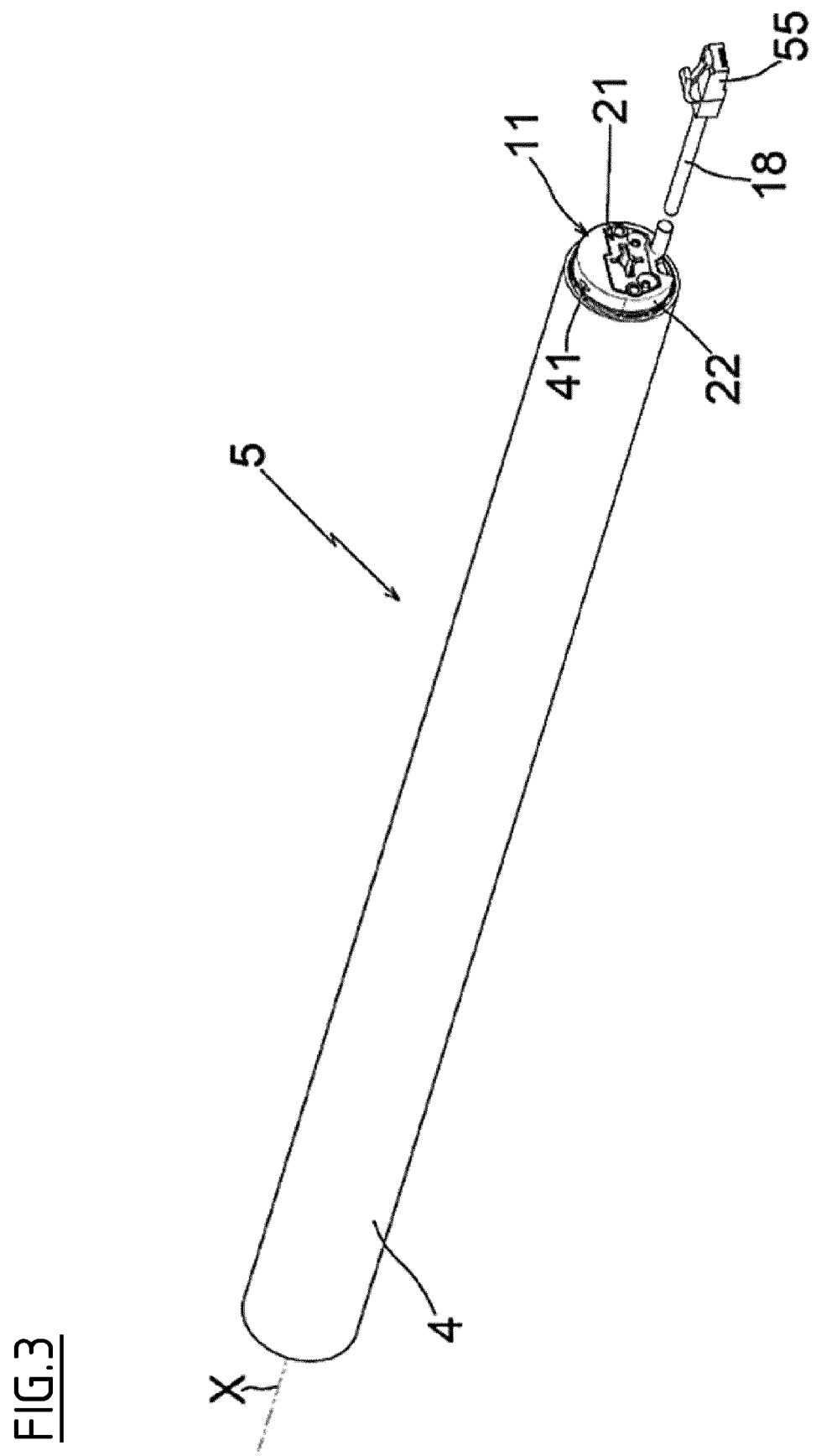
FIG. 3 is a schematic perspective view of a motorized driving device for the installation illustrated in FIGS. 1 and 2, this motorized driving device comprising an electromechanical actuator in accordance with the invention and a winding tube.

Here and as illustrated in FIGS. 3 to 5, the torque support 21 further comprises a cap 22. The cap 22 is mounted on the second part 21b of the torque support 21, in particular in the assembled configuration of the electromechanical actuator 11.

Advantageously, the second electronic board 15b is arranged within a recess 43 formed between the second part 21b of the torque support 21 and the cap 22.

The torque support 21 comprises at least one selection device 41, in particular a button, which can be, for example, a push button.

Said selection device(s) 41 are configured to carry out an adjustment of the electromechanical actuator 11 through one or more configuration modes, to pair with the electromechanical actuator 11 one or more command units 12, 13, to reset one or more parameters, which can be, for example, an end-of-travel position, to reset the paired command unit or units 12, 13 or to control the movement of the screen 2.

Here, the torque support 21 comprises a single selection device 41.

The number of selection devices of the torque support is not limiting and can be different. It can be, especially, greater than or equal to two.

The torque support 21 comprises at least one display device, not shown.

This display device or these display devices are configured to display a visual indication, which can be, for example, representative of an operating mode of the electromechanical actuator 11, in particular a configuration mode or a control mode, or of a status of a member of the motorized driving device 5 or of the electrical power supply device 31, in particular a charging status of the battery 24.

Advantageously, the display device comprises at least one illumination source, not shown, in particular a light-emitting diode, mounted on the second electronic board 15b, and, eventually, a transparent or translucent cover and/or a light guide, to allow the light emitted by the illumination source to pass through.

Here, the torque support 21 comprises a single display device.

The number of display devices is not limiting and can be different. It can be, especially, greater than or equal to two.

Advantageously, the selection device 41 and the display device are electrically connected, in other words are configured to be electrically connected, to the electronic control unit 15.

Here, the selection device 41 and the display device are electrically connected, in other words are configured to be electrically connected, to the second electronic control board 15b.

In a variant, the selection device 41 and/or the display device can be electrically connected, in other words can be configured to be electrically connected, to the first electronic control board 15a.

The torque support 21 can comprise either the selection device(s) 41 or the display device(s), or the selection device(s) 41 and the display device(s).

The torque support 21 comprises at least one housing 44. Furthermore, the housing 44 accommodates, in other words is configured to house or accommodate, at least the selection device(s) 41 or display device(s), in particular in the assembled configuration of the electromechanical actuator 11.

In this way, the housing 44 accommodates, in other words is configured to accommodate, at least one item of equipment between the selection device(s) 41 and the display device(s), in particular in the assembled configuration of the electromechanical actuator 11.

Here, the torque support 21 comprises a single housing 44, where the selection device 41 and the display device are housed.

In a variant, not shown, the torque support 21 can comprise a first housing 44 for the selection device 41 and a second housing 44 for the display device. The torque support 21 can further comprise a first housing 44 for each selection device 41 or for a plurality of selection devices 41, in the case that the torque support 21 has a plurality of selection devices 41, and a second housing 44 for each display device or for a plurality of display devices, in the case that the torque support 21 has a plurality of display devices.

Advantageously, the output shaft 20 of the electromechanical actuator 11 is arranged inside the winding tube 4 and at least partly outside the casing 17 of the electromechanical actuator 11.

Here, one end of the output shaft 20 protrudes from the casing 17 of the electromechanical actuator 11, in particular from a second end 17b of the casing 17 opposite the first end 17a.

Advantageously, the output shaft 20 of the electromechanical actuator 11 is configured to rotate a connecting element, not shown, connected to the winding tube 4. The connecting element is in the form of a wheel.

When the electromechanical actuator 11 is switched on, the electric motor 16 and the gearbox 19 rotate the output shaft 20. Furthermore, the output shaft 20 rotates the winding tube 4 via the connecting element.

Thus, the winding tube 4 rotates the screen 2 of the shading device 3, so that the opening 1 is opened or closed.

The electronic control unit 15 of the electromechanical actuator 11 comprises a device to detect obstacles and end-of-travel, not shown, during the winding of the screen 2 and during the unwinding of that screen 2.

The device to detect obstacles and end-of-travel during the winding and unwinding of the screen 2 is implemented by means of the microcontroller 30 of the electronic control unit and, in particular, by means of an algorithm implemented by this microcontroller 30.

The electromechanical actuator 11 further comprises a device for discharging electrostatic charge 45.

The device for discharging electrostatic charge 45 comprises at least one electrical conduction element 51. The or each electrical conduction element 51 is configured to be in electrical contact, in other words is in electrical contact, with the winding tube 4, in particular in the assembled configuration of the motorized driving device 5 and, therefore, of the shading device 3.

Here, the device for discharging electrostatic charge 45 comprises a single electrical conduction element 51.

The number of electrical conduction elements is not limiting and can be different. It can be, especially, greater than or equal to two.

With reference to FIGS. 4 to 8, the integration of the device for discharging electrostatic charge 45 in the electromechanical actuator 11 is now described.

The ring 53 bears the electrical conduction element 51 of the device for discharging electrostatic charge 45.

The electrical power supply cable 18 comprises at least one shielding 46.

Advantageously, the second electrical conductors 38 are arranged inside the shielding 46 of the electrical power supply cable 18.

Advantageously, the electrical power supply cable 18 also comprises an insulating sheath 47. Furthermore, the shielding 46 is provided between the insulating sheath 47 and the second electrical conductors 38.

In practice, the electrical power supply cable 18 can comprise at least the second electrical conductors 38, a dielectric material, not shown, in other words an insulating material, the shielding 46 and the insulating sheath 47. The second electrical conductors 38 are surrounded by the dielectric material. The dielectric material is surrounded by the shielding 46. Furthermore, the shielding 46 is surrounded by the insulating sheath 47. The shielding 46 can be in the form of a conductive braid, for example one made of copper.

Figure 7:
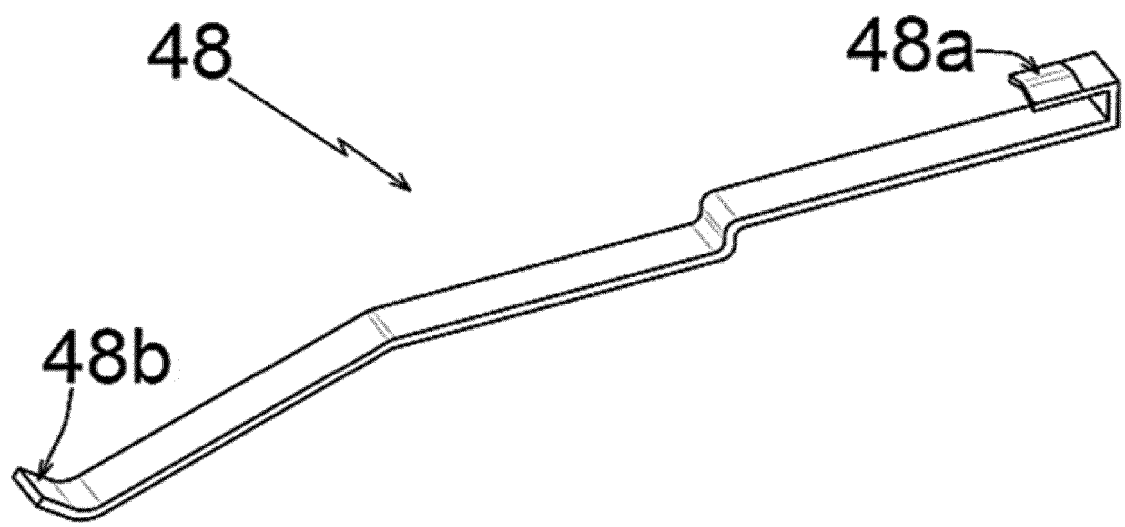
FIG. 7 is a perspective schematic view of an electrical linking element belonging to the electromechanical actuator illustrated in FIGS. 3 to 6.
Figure 8:
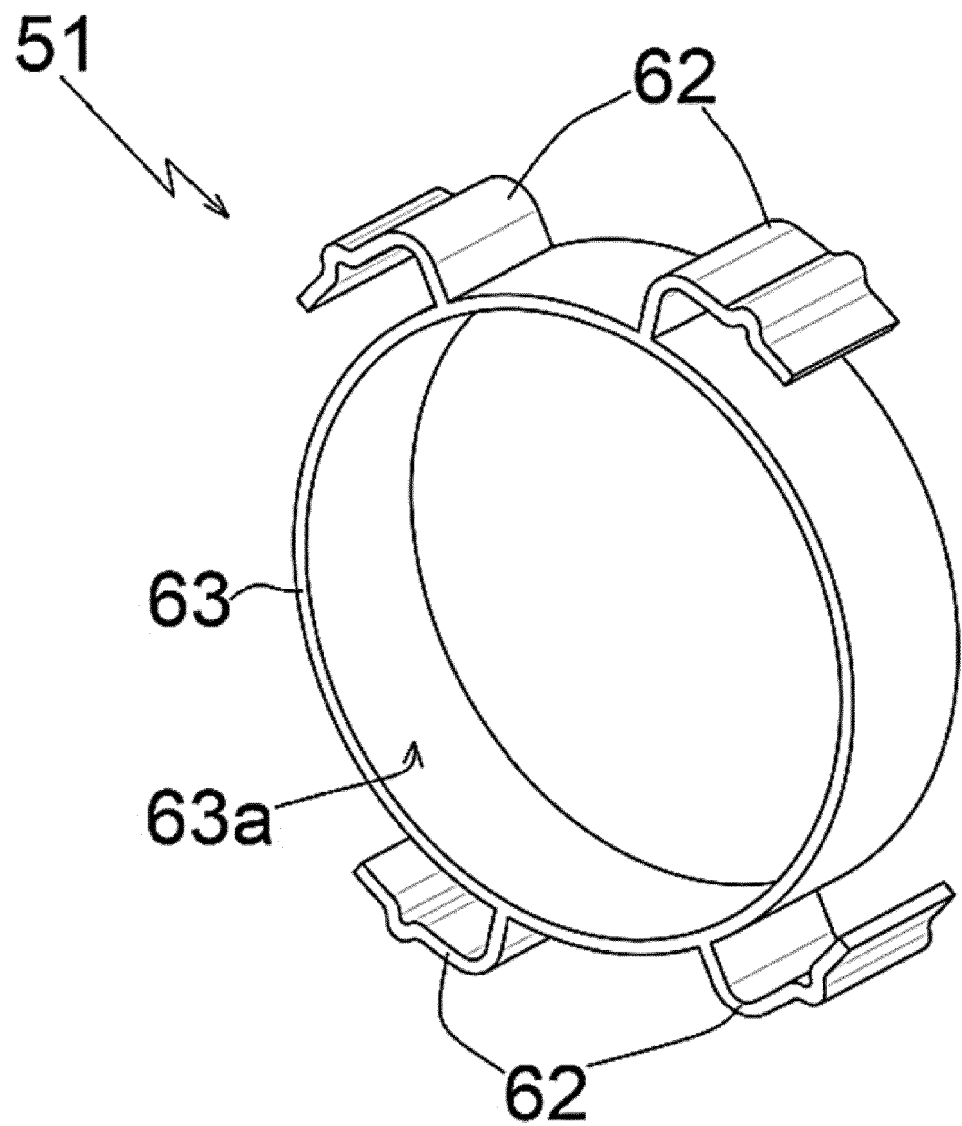
FIG. 8 is a perspective schematic view of an electrical conduction element belonging to the electromechanical actuator illustrated in FIGS. 3 to 6.

The device for discharging electrostatic charge 45 further comprises at least one electrical linking element 48, shown on its own in FIG. 7.

The torque support 21 accommodates, in particular in its interior, at least part of the electrical linking element 48. In other words, the electrical linking element 48 is mounted at least partly inside the torque support 21, in particular in the assembled configuration of the electromechanical actuator 11.

Here, the electrical linking element 48 is arranged, on the one hand, inside the torque support 21 and, on the other hand, inside the casing 17, in particular in the assembled configuration of the electromechanical actuator 11.

The electrical conduction element 51, arranged at the ring 53, is configured to be in electrical contact, in other words is in electrical contact, with the electrical linking element 48, arranged at least partly at the torque support 21, in particular in the assembled configuration of the electromechanical actuator 11.

The electrical linking element 48 electrically connects, in other words is configured to electrically connect, the electrical conduction element 51 to the shielding 46 of the electrical power supply cable 18.

Here, the device for discharging electrostatic charge 45 comprises a single electrical linking element 48.

The number of electrical linking elements is not limiting and can be different. It can be, especially, greater than or equal to two.

Thus, the evacuation of electrostatic charges through the device for discharging electrostatic charge 45 makes it possible to create a preferential discharge path from the winding tube 4, to the electrical conduction element 51, arranged at the ring 53, to the electrical linking element 48, arranged at least partly at the torque support 21, then to the shielding 46 of the electrical power supply cable 18.

In this way, the evacuation of electrostatic charges through the electrical conduction element 51, arranged at the ring 53, and the electrical linking element 48, arranged inside the electromechanical actuator 11, in particular inside the torque support 21 and, eventually, the casing 17, makes it possible to avoid malfunctions and/or damage to the electromechanical actuator 11 and, eventually, of the electrical power supply device 31 and, in particular, to prevent the destruction of electronic components 56 mounted on the printed circuit board or boards 40a, 40b, in particular of one or other of the first and second electronic boards 15a, 15b of the electronic control unit 15.

Therefore, the electrical conduction element 51 and the electrical linking element 48 enable electrostatic charges accumulated in a screen 2 of the shading device 3 of the installation 6 to be dissipated.

In this way, the electrical conduction element 51 and the electrical linking element 48 make it possible to protect electronic control unit 15 of the electromechanical actuator 11, in particular the first and second electronic boards 15a, 15b.

Furthermore, the electrical conduction element 51 and the electrical linking element 48 make it possible to limit overvoltage on the electronic components 56 mounted on the printed circuit board(s) 40a, 40b, in particular of one or the other of the first and second electronic boards 15a, 15b of the electronic control unit 15, so as to protect the electronic control unit 15.

Moreover, the discharge of electrostatic charges through the device for discharging electrostatic charge 45 is carried out continuously.

In this way, the electromechanical actuator 11 is not subjected to a discharge of electrostatic charges via an electric arc, following an accumulation of electrostatic charges due, especially, to the screen 2 rubbing against one or more assembly elements of the shading device 3, such as those of the holding device 9, 23.

Such a device for discharging electrostatic charge 45 made by means of the electrical linking element 48 electrically connecting the electrical conduction element 51 to the shielding 46 of the electrical power supply cable 18 is inexpensive, simple to scale up in production and minimizes the cost of obtaining the electromechanical actuator 11.

To enable the electrostatic charges to be discharged, the electrical conduction element 51 and the electrical linking element 48 are made of an electrically conductive metallic material, for example copper, brass or steel.

Moreover, an external face of the casing 17 of the electromechanical actuator 11 can be covered with paint, as is generally done, since the discharge of electrostatic charge is carried out by electrical conduction between the winding tube 4 and the electrical conduction element 51 then between the electrical conduction element 51 and the electrical linking element 48.

Advantageously, the electrical conduction element 51 is rotatable relative to the electrical linking element 48.

Here, the electrical conduction element 51 is configured to be in electrical contact, in other words is in electrical contact, with the winding tube 4, in particular an inner face 4a thereof.

Advantageously, the electrical conduction element 51 is in permanent electrical contact with the electrical linking element 48 when the ring 53 is rotated around the torque support 21, in particular when the electromechanical actuator 11 is electrically activated.

Advantageously, the electrical conduction element 51 comprises a body 63 and at least one contact tab 62. Furthermore, the or each contact tab 62 is connected to the body 63.

Here, the body 63 of the electrical conduction element 51 is made of a single part and is annular in shape.

Here, the electrical conduction element 51 comprises four contact tabs 62.

Here, the contact tabs 62 are integral with the body 63.

The number of contact tabs is not limiting and can be different. It can be, especially, one, two, three or more than or equal to five.

Here, the or each contact tab 62 of the electrical conduction element 51 is configured to be in electrical contact, in other words is in electrical contact, with the winding tube 4, in particular an inner face 4a thereof. Furthermore, the body 63 of the electrical conduction element 51, in particular an inner face 63a thereof, is configured to be in electrical contact, in other words is in electrical contact, with the electrical linking element 48.

Advantageously, the ring 53 comprises at least one opening 64. Furthermore, the or each contact tab 62 of the electrical conduction element 51 passes through the or one of the openings 64 of the ring 53, in particular in the configuration of the electromechanical actuator 11.

Here, the ring 53 comprises four openings 64.

Advantageously, the ring 53 comprises a number of openings 64 equal to the number of contact tabs 62 of the electrical conduction element 51.

Advantageously, the electrical conduction element 51, in particular its body 63, is overmolded in the ring 53 and thus forms an integral part of the ring 53. In this sense, the ring 53 comprises the electrical conduction element 51.

In a variant, the electrical conduction element 51 is a part assembled with the ring 53, in other words a part separate from the ring 53 configured to be assembled with the ring 53.

In all cases, the ring 53 bears the electrical conduction element 51.

Advantageously, the ring 53 is made of a plastic material.

Thus, when the winding tube 4 is rotated by the electrical activation of the electromechanical actuator 11, the friction of the ring 53 on the inner face 4a of the winding tube 4 does not give rise to any additional operating noise or jerks when the screen 2 is unwound or wound up, compared with an electromechanical actuator 11 without the device for discharging electrostatic charge 45.

Advantageously, the electrical linking element 48 is in the form of a first blade, especially a metal blade.

Advantageously, the first blade forming the electrical linking element 48 is configured to be in electrical contact, in other words is in electrical contact, with the inner face 63a of the body 63 of the electrical conduction element 51, in particular in the assembled configuration of the electromechanical actuator 11.

Advantageously, the electrical conduction element 51 is configured to be in electrical contact, in other words is in electrical contact, with the electrical linking element 48 by friction or by sliding of the electrical conduction element 51, in particular of the body 63 thereof, on the electrical linking element 48, in particular of the first blade forming the latter.

Advantageously, the electronic control unit 15 further comprises a first electrical connecting element 49, in particular a second blade, for example metallic, and a second electrical connecting element 50. The first electrical connecting element 49 is mounted on the printed circuit board 40a of the first electronic board 15a, in particular in an assembled configuration of the electronic control unit 15. The electrical linking element 48 is electrically connected to the first electrical connecting element 49, especially brought into electrical contact with the first electrical connecting element 49, in particular in the assembled configuration of the electromechanical actuator 11. The second electrical connecting element 50 is electrically connected to the first electrical connecting element 49, especially electrically connected with the first electrical connecting element 49, in particular in the assembled configuration of the electromechanical actuator 11. Furthermore, the second electrical connecting element 50 is electrically connected to the shielding 46 of the electrical power supply cable 18, in particular in the assembled configuration of the electromechanical actuator 11.

Advantageously, the electrical linking element 48 extends from the electrical conduction element 51 to the first electrical connecting element 49 of the electronic control unit 15, in particular in the assembled configuration of the electromechanical actuator 11.

Here and as illustrated in FIGS. 4 and 5, the electrical linking element 48 extends inside the first and second parts 21a, 21b of the torque support 21 and, therefore, partially inside the casing 17.

Advantageously, the electrical linking element 48 comprises at least one first end 48a and a second end 48b, the second end 48 being opposite the first end 48a. The first end 48a of the electrical linking element 48 is positioned opposite the electrical conduction element 51, in particular the body 63 of the electrical conduction element 51 and, more particularly, in electrical contact with the latter. Furthermore, the second end 48b of the electrical linking element 48 is arranged at the first electrical connecting element 49 of the electronic control unit 15, in particular in electrical contact with the first electrical connecting element 49, in this case of the first electronic board 15a.

Here, the discharge of electrostatic charges is implemented by the circulation of an electric current from the screen 2 then passing through the winding tube 4, in the electrical conduction element 51, in the electrical linking element 48, arranged inside the electromechanical actuator 11, in the first and second electrical connection elements 49, 50 of the electronic control unit 15 and in the shielding 46 of the electrical power supply cable 18.

Advantageously, the shielding 46 of the electrical power supply cable 18 is further configured to be electrically connected, in other words is electrically connected, to an earth, in particular an earth of the installation 6, in an installed state of the electromechanical actuator 11 in the installation 6.

Here, the casing 17 of the electromechanical actuator 11 is not electrically earthed.

Thus, the electromechanical actuator 11 can be electrically connected to the electrical power supply network 52 without the need for an earth electrical conductor, both at the electromechanical actuator 11 and at the electrical power supply network 52, when installing the electromechanical actuator 11, so as to simplify the installation of the electromechanical actuator 11 and reduce the costs of obtaining the electromechanical actuator 11.

Advantageously, the electrical linking element 48 is brought into electrical contact, in other words is configured so as to be brought into electrical contact, with the first electrical connecting element 49 of the electronic control unit 15, in particular of the first electronic board 15a, when the torque support 21 is assembled on the casing 17.

Here, such assembly of the torque support 21 on the casing 17 can be carried out using automated means during the manufacture of the electromechanical actuator 11.

Here, the ring 53 is locked against translation relative to the torque support 21, in the direction of the axis of rotation X.

Thus, the ring 53 cannot be driven to move along the axis of rotation X and slide along the casing 17 of the electromechanical actuator 11.

In this way, the ring 53 is driven only to rotate by the winding tube 4, in particular during electrical activation of the electromechanical actuator 11.

Advantageously, the ring 53 is configured so as to be rigidly connected, in other words is rigidly connected, to the winding tube 4, when the winding tube 4 is rotated around the casing 17 of the electromechanical actuator 11, in particular when the electromechanical actuator 11 is electrically activated.

Here, the winding tube 4 comprises ribs 61. The ribs 61 are provided on the inner face 4a of the winding tube 4 and are oriented towards the axis of rotation X. The or each contact tab 62 of the electrical conduction element 51 is positioned between two ribs 61 of the winding tube 4, in particular in the assembled configuration of the motorized driving device 5.

Thus, when the winding tube 4 is rotated around the casing 17 of the electromechanical actuator 11, the or at least one of the contact tabs 62 of the electrical conduction element 51 is brought to bear against one of the ribs 61 of the winding tube 4.

In this way, the ring 53 is rotated by the winding tube 4, around the torque support 21 and, eventually, the casing 17 of the electromechanical actuator 11.

Figure 9:
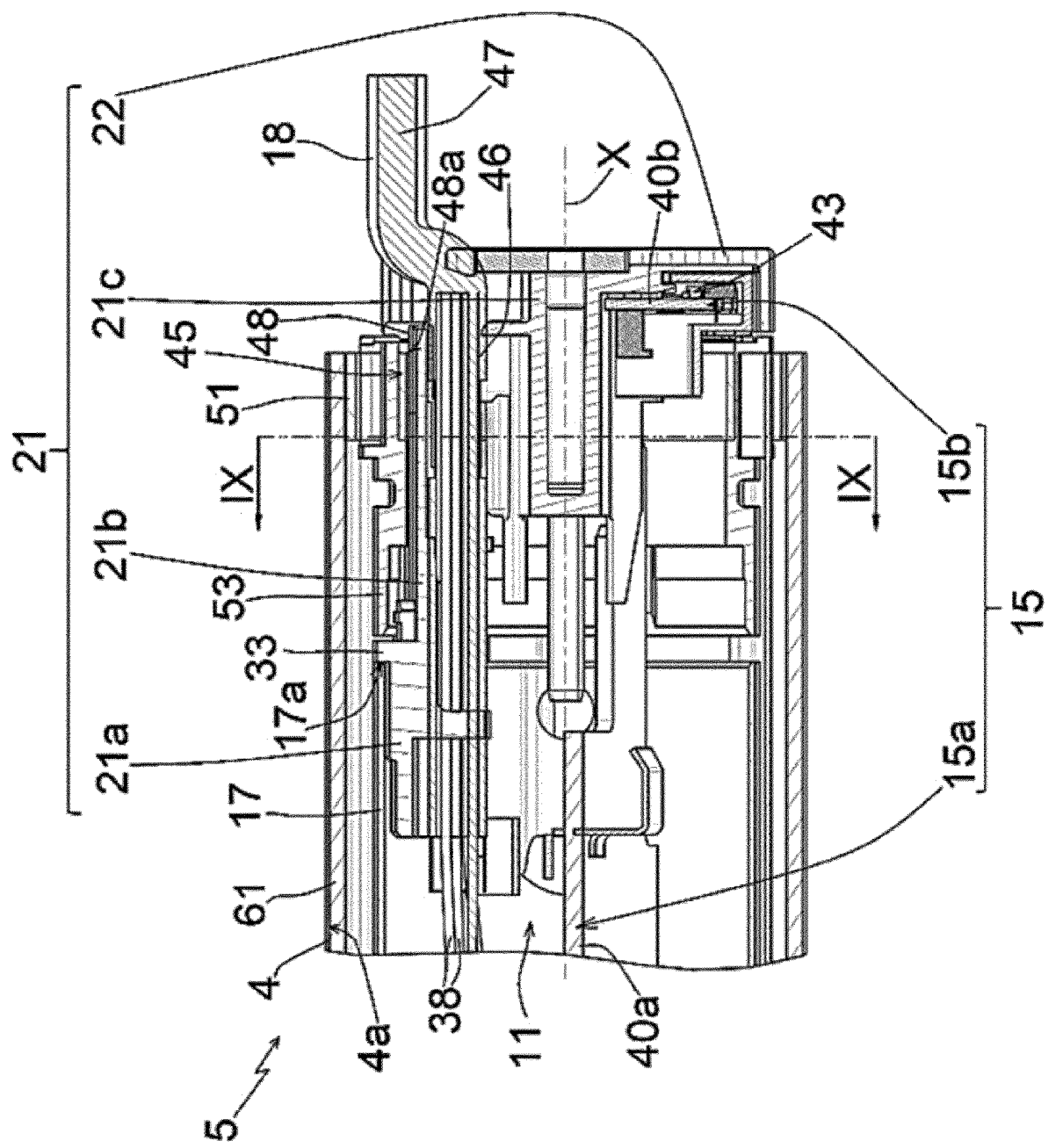
FIG. 9 is a schematic cross-sectional view similar to FIG. 5 for an electromechanical actuator according to a second embodiment, in a different orientation of the motorized driving device around an axis of rotation X.
Figure 10:
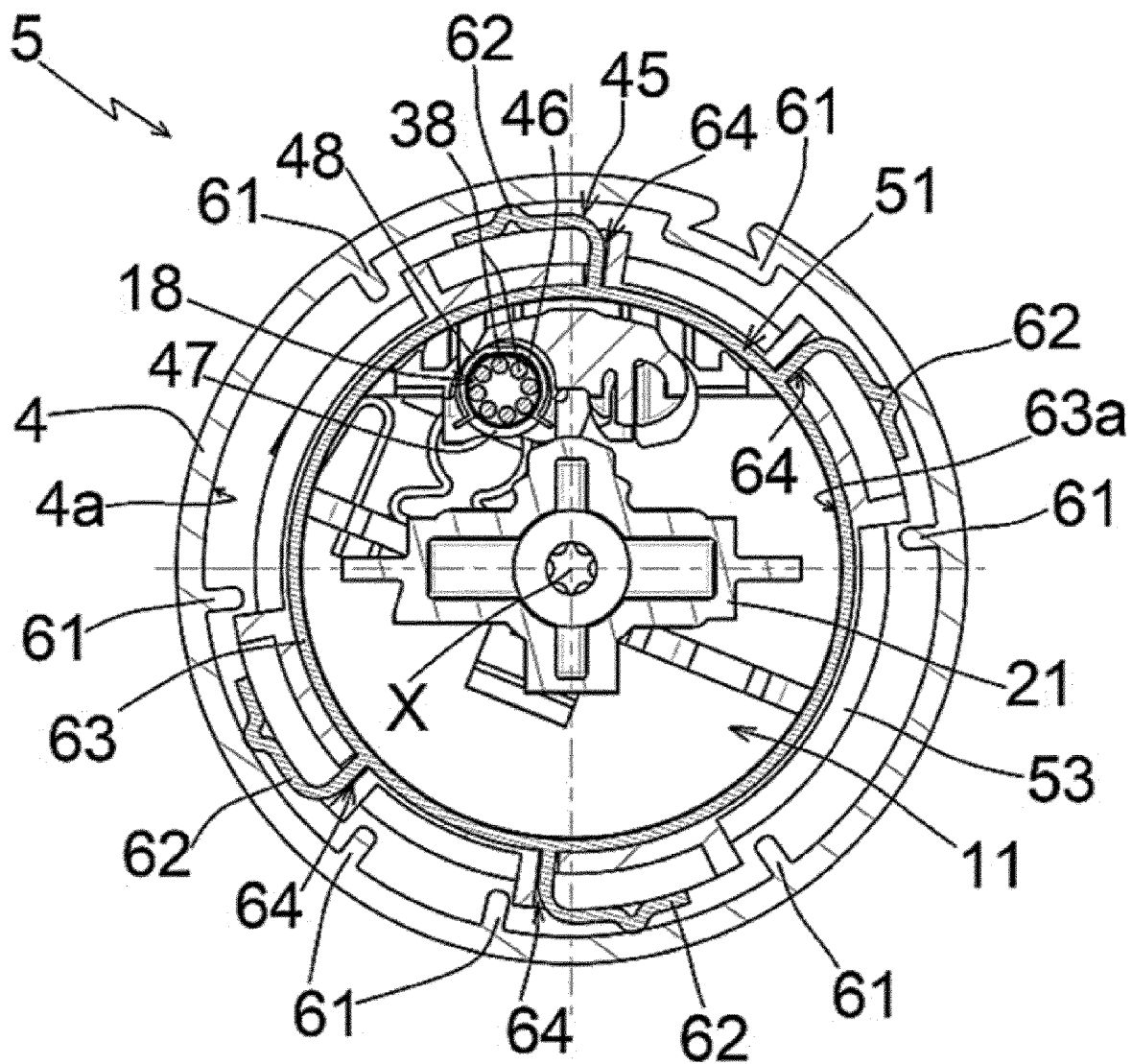
FIG. 10 is a schematic cross-sectional view similar to FIG. 6 for the electromechanical actuator according to the second embodiment, the section plane of FIG. 10 being marked by line IX-IX in FIG. 9.
Figure 11:
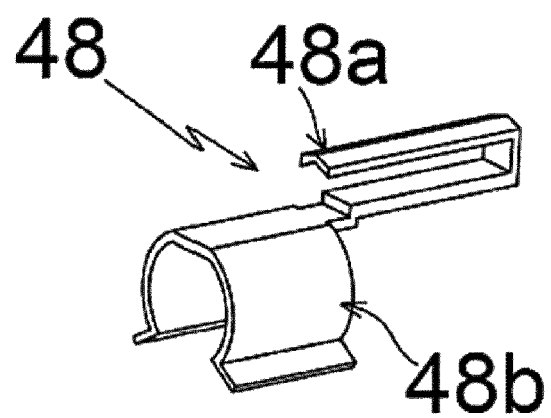
FIG. 11 is a view similar to FIG. 7 for the electromechanical actuator according to the second embodiment.

In the second embodiment, shown in FIGS. 9 to 11, the elements similar to those of the first embodiment have the same references and operate as explained above. In the following, only the main differences between this second embodiment and the previous one are described. In the following, where a reference sign is used without being reproduced in FIGS. 9 to 11, or is reproduced in FIGS. 9 to 11 without being mentioned in the description, it corresponds to the object bearing the same reference in one of FIGS. 1 to 8.

With reference to FIGS. 9 to 11, we now describe the electromechanical actuator 11 according to the second embodiment of the invention and, more particularly, the device for discharging electrostatic charge 45 of this electromechanical actuator 11.

Here, the electrical linking element 48 is in the form of a jumper, preferably made of one piece. The electrical linking element 48 comprises a pin-shaped first end 48a, configured to be in contact with the inner face 63a of the body 63 of the electrical conduction element 51, in particular in the assembled configuration of the motorized driving device 5. The electrical linking element 48 further comprises a clip-shaped second end 48b, configured to surround the shielding 46, in particular in the assembled configuration of the motorized driving device 5.

Here, the electrical linking element 48 is connected directly to the shielding 46 of the electrical power supply cable 18, in other words without being electrically connected to the electronic control unit 15.

In this case, the discharge of electrostatic charge is implemented by the circulation of an electric current from the screen 2 then passing through the winding tube 4, in the electrical conduction element 51, arranged at the ring 53, in the electrical linking element 48 and in the shielding 46 of the electrical power supply cable 18, without passing through elements mounted on the first electronic board 15a, in particular the first printed circuit board 40a.

Thanks to the present invention, whatever the embodiment, the discharge of electrostatic charge through the device for discharging electrostatic charge makes it possible to create a preferential discharge path from the winding tube, to the electrical conduction element, arranged at the ring, to the electrical linking element, arranged at least partly at the torque support, then to the shielding of the electrical power supply cable.

In this way, the discharge of electrostatic charges through the electrical conduction element, arranged at the ring, and through the electrical linking element, arranged inside the electromechanical actuator, in particular inside the torque support and, eventually, the casing, makes it possible to avoid malfunctions and/or damage to the electromechanical actuator and, in particular, to prevent the destruction of electronic components mounted on one or more printed circuit boards of an electronic control unit.

Numerous modifications can be made to the above-described embodiments, without departing from the scope of the invention defined by the claims.

In a variant, the electrical power supply cable 18 comprises at least one earth electrical conductor. In this case, the earth electrical conductor replaces the shielding 46 of the electrical power supply cable 18. In this case too, the earth electrical conductor is one of the second electrical conductors 38 of the electrical power supply cable 18. Therefore, the electrical power supply cable 18 can be without the shielding 46.

In a variant, not shown, the electrical conduction element 51, arranged at the ring 53, is periodically in electrical contact with the electrical linking element 48, arranged at least partly at the torque support 21, when the ring 53 is rotated around the torque support 21, in particular when the electromechanical actuator 11 is electrically activated. In this case, the body 63 of the electrical conduction element 51 can be made in several parts, which can be, for example, ring sections.

In a variant, not shown, the electrical conduction element 51 comprises one or more brushes. In this case, the brush or brushes replace the contact tab or tabs 62 of the electrical conduction element 51. Advantageously, the or each brush comprises a plurality of metal wires, which can be, for example, copper, brass or steel.

In a variant, not shown, the electronic control unit 15 further comprises a housing. Furthermore, the first electronic board 15a is arranged inside the housing, in particular in the assembled configuration of the electronic control unit 15. Thus, the housing of the electronic control unit 15 protects the first electronic board 15a, during assembly of the electromechanical actuator 11 and following assembly of the latter. In this way, the housing of the electronic control unit 15 allows the first electronic board 15a to be electrically isolated from the casing 17. Advantageously, the external diameter of the housing of the electronic control unit 15 is smaller than the internal diameter of the casing 17, so that the housing can be inserted into the casing 17, when the electromechanical actuator 11 is assembled. In a first case, the housing of the electronic control unit 15 can comprise two half-shells configured to cooperate together, in particular in the assembled configuration of the electronic control unit 15. In the assembled configuration of the electromechanical actuator 11, the two half-shells are assembled together, so as to define a joining plane extending in a direction parallel to the axis of rotation X. Advantageously, at least one of the two half-shells forming the housing comprises elements for positioning and fixing the first electronic board 15a, especially the first printed circuit board 40a, in particular in the assembled configuration of the electronic control unit 15. In a second case, the housing of the electronic control unit 15 can comprise one or more sections, the or each section being in the form of a hollow tube. The or each section is configured to house or accommodate, in other words houses or accommodates, the first electronic board 15a, in particular in the assembled configuration of the electronic control unit 15. In this case, the or each housing section comprises a first groove and a second groove. Furthermore, the first and second grooves are configured to hold in position, in other words hold in position, the first electronic board 15a, especially the first printed circuit board 40a, inside the housing, in particular in the assembled configuration of the electronic control unit 15.

In a variant, the value of the voltage of the electrical power supply network 52 can be on the order of 230 volts. Furthermore, the electric motor 16 can also be asynchronous.

Furthermore, the contemplated embodiments and variants can be combined to form new embodiments of the invention, without departing from the scope of the invention defined by the claims.

The invention claimed is:

1. An electromechanical actuator for a shading device, the electromechanical actuator comprising at least:
   a casing,
   a torque support, the torque support being arranged at a first end of the casing,
   a ring, the ring being inserted at least partly around the torque support, the ring forming a bearing guiding the rotation of a winding tube of a motorized driving device of the shading device, around the casing of the electromechanical actuator,
   an electrical power supply cable, the electrical power supply cable being configured to be connected to an electrical power supply network, the electrical power supply cable comprising either at least one shielding or at least one earth electrical conductor,
   an electric motor, the electric motor being mounted within the casing, the electric motor being supplied with electrical energy via the electrical power supply cable, and
   a device for discharging electrostatic charge, the device for discharging electrostatic charge comprising at least one electrical conduction element, the electrical conduction element being configured to be in electrical contact with the winding tube,
   wherein
   the ring bears the electrical conduction element of the device for discharging electrostatic charge, the device for discharging electrostatic charge further comprises at least one electrical linking element, the torque support at least partly accommodates the electrical linking element, in that the electrical conduction element, arranged at the ring, is configured to be in electrical contact with the electrical linking element, arranged at least partly at the torque support, and in that the electrical linking element electrically connects the electrical conduction element to the shielding of the electrical power supply cable or to the earth electrical conductor of the electrical power supply cable.

2. The electromechanical actuator for a shading device according to claim 1, wherein the electrical conduction element, arranged at the ring, is rotatable relative to the electrical linking element, arranged at least partly at the torque support.

3. The electromechanical actuator for a shading device according to claim 2, wherein the electrical conduction element, arranged at the ring, is in permanent electrical contact with the electrical linking element, arranged at least partly at the torque support, when the ring is rotated around the torque support.

4. The electromechanical actuator for a shading device according to claim 2, wherein the electrical conduction element, arranged at the ring, is periodically in electrical contact with the electrical linking element, arranged at least partly at the torque support, when the ring is rotated around the torque support.

5. The electromechanical actuator for a shading device according to claim 1, wherein:

the electromechanical actuator further comprises an electronic control unit, the electronic control unit comprises at least:

a printed circuit board, a first electrical connecting element, the first electrical connecting element being mounted on the printed circuit board, and a second electrical connecting element, the second electrical connecting element being electrically connected to the first electrical connecting element, the electrical linking element is electrically connected to the first electrical connecting element, and the second electrical connecting element is electrically connected to the shielding of the electrical power supply cable or to the earth electrical conductor of the electrical power supply cable.

6. The electromechanical actuator for a shading device according to claim 5, wherein the electrical linking element extends from the electrical conduction element, arranged at the ring, to the first electrical connecting element of the electronic control unit.

7. The electromechanical actuator for a shading device according to claim 1, wherein:

in that the electrical conduction element comprises a body and at least one contact tab, and in that the or each contact tab is connected to the body.

8. A motorized driving device for a shading device, the motorized driving device comprising at least:

an electromechanical actuator, a winding tube, the winding tube being arranged to be rotated by the electromechanical actuator, wherein the electromechanical actuator is in accordance with claim 1.

9. The motorized driving device for a shading device according to claim 8, wherein the electrical conduction element, arranged at the ring, is configured to be in electrical contact with an inner face of the winding tube.

10. A shading device comprising at least:

a screen, and a motorized driving device, the screen being rollable on a winding tube of the motorized driving device, wherein the motorized driving device is in accordance with claim 8.

* * * * *